May 23, 1967      T. KENNEDY      3,321,357
REINFORCED COVERING FOR PIPES AND METHOD OF MAKING THE SAME
Filed March 5, 1962
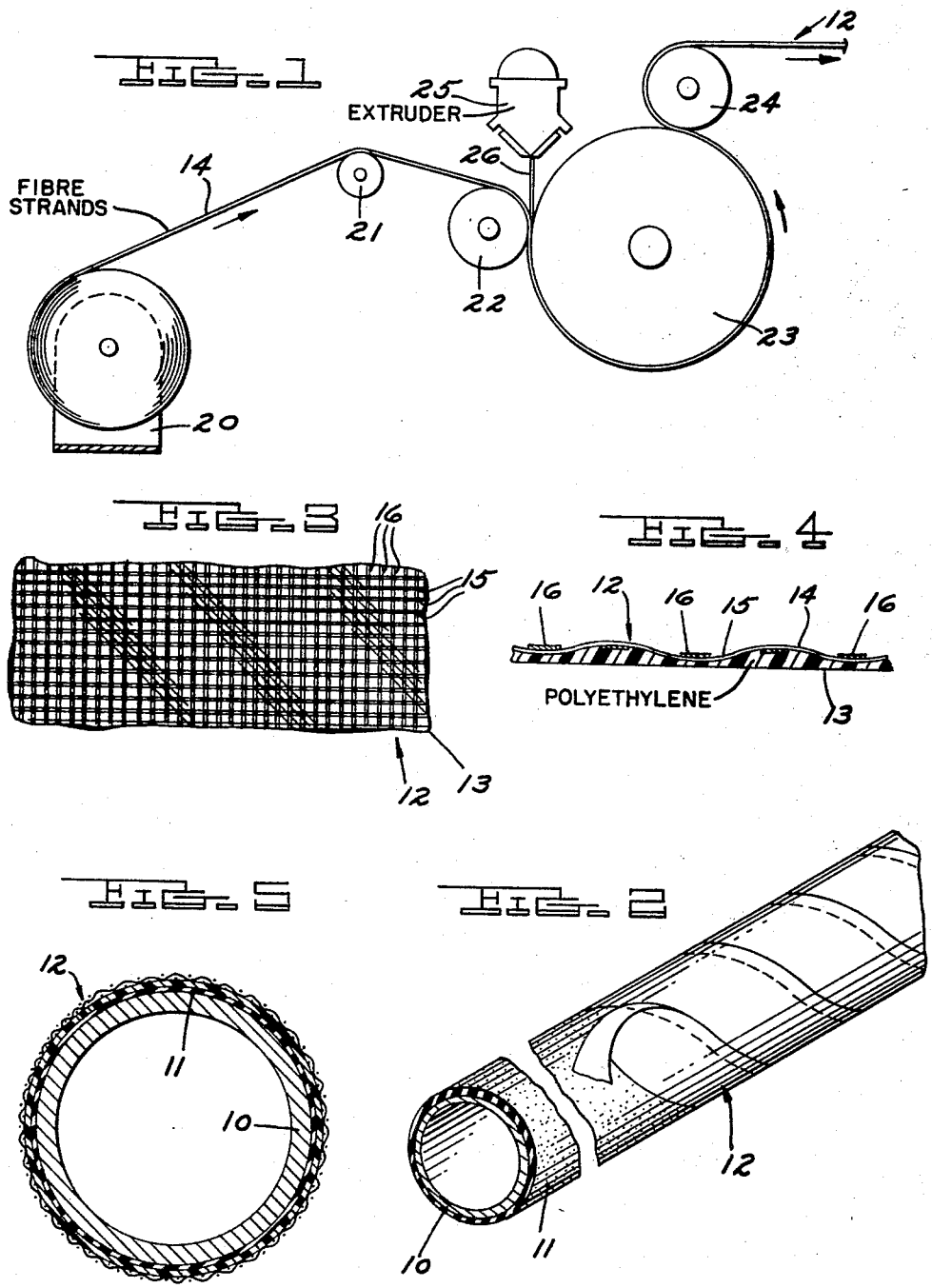

United States Patent Office 3,321,357
Patented May 23, 1967

3,321,357
REINFORCED COVERING FOR PIPES AND
METHOD OF MAKING THE SAME
Ted Kennedy, Ann Arbor, Mich., assignor to The Trenton Corporation, Ann Arbor, Mich., a corporation of Michigan
Filed Mar. 5, 1962, Ser. No. 177,507
6 Claims. (Cl. 161—93)

This invention relates generally to a reinforced covering for pipes and to a method of making the same.

One of the objects of this invention is to provide a pipe covering which effectively protects a buried length of pipe against corrosion and the effects of soil stress. More particularly the present invention concerns itself with a wrapping or covering capable of being applied directly on the pipe or on the noncorrodible material usually applied on the outer surface of the pipe prior to or during laying the pipe in the soil. The noncorrodible material is of a nature to protect the pipe against attack by the soil of a chemical nature, but does not satisfactorily protect the pipe against the destructive effects of soil stress. The wrapping or covering forming the subject matter of this invention, when used in conjunction with a noncorrodible coating of the above type, not only protects the coating from mechanical injury due to soil stress, but in addition, greatly assists the coating in resisting any possibility of the soil chemically attacking the pipe.

More specifically the present invention contemplates an improved pipe covering in the form of a strip sufficiently flexible to enable spirally wrapping the same around a length of pipe with or without a noncorrodible coating thereon either prior to or during laying of the pipe into the soil.

It is another object of this invention to provide a pipe covering of the above general type reinforced to possess the required tensile strength to enable tightly wrapping the covering around the pipe, and also possessing dielectric characteristics to prevent stray electrical currents in the soil from reaching the pipe.

Another object is to provide an improved method of making a reinforced pipe covering.

Other objects and features of the invention will become apparent as the description proceeds, especially when taken in conjunction with the accompanying drawings, wherein:

FIGURE 1 is a view illustrating the manufacture of the reinforced flexible wrapper or strip embodying the invention.

FIGURE 2 is a perspective view of a length of pipe having a protective covering including the reinforced flexible wrapper or strip.

FIGURE 3 is a fragmentary plan view of the strip.

FIGURE 4 is a sectional view of the strip.

FIGURE 5 is a sectional view showing the protective covering, including the strip, applied to the pipe.

Although it is possible to apply the strip or wrapper of this invention directly to the outer surface of a length of pipe, nevertheless particularly satisfactory results have been obtained by applying it to a pipe which has previously been coated with a noncorrodible material. Referring to the drawing, 10 designates a length of pipe and 11 indicates a coating on the outer surface of the pipe. The coating is a corrosion-resistant heat-softenable compound, and preferably a microcrystalline wax.

Corrosive resistant compounds of the above general type are usually applied directly to the outer surface of a length of pipe either before or during laying of the pipe in the soil. In any case the compound is in a molten or semi-molten state when applied to the pipe so that it closely conforms to the outer surface of the pipe and adheres to this surface when allowed to set.

In accordance with the present invention, the action of the coating 11 in protecting the pipe from corrosion due to the action of moisture, chemicals in the soil, etc., is supplemented by a covering or wrapping in the form of an elongated flexible laminated strip or tape 12. The strip 12 is shown as having two laminations, designated 13 and 14, permanently secured together and forming opposite exposed surfaces of the strip. The lamination 13 is a plastic film, and particularly satisfactory results have been obtained by the use of a polyethylene film. A polyethylene film is relatively inexpensive and possesses many desirable characteristics. For example, a polyethylene film has negligible water absorption, exceptional dielectric qualities, is impermeable to gases, has low water-vapor transmission, is capable of being readily heat-sealed, is chemically inert at normal temperatures, is tough and has excellent aging characteristics. Moreover, polyethylene has outstanding low temperature flexibility.

The lamination 14 serves to reinforce the polyethylene film lamination 13, and comprises fibers having exceptionally high tensile strength. The fibers are grouped into the flexible strands 15 and 16. The strands 15 extend lengthwise of the strip in laterally spaced parallel relation, and the strands 16 extend crosswise of the strip, at right angles to the strands 15, likewise in laterally spaced parallel relation. The strands 15 are spaced apart approximately twenty strands per inch, as are the strands 16. As shown in FIGURE 4, the strands 15 weave under and over alternate strands 16, and it will be understood that strands 16 are interwoven in the same way with strands 15. Although various inorganic or organic fibers may be employed, glass fibers are preferred since they are moisture resistant and have exceptionally high tensile strength. In any case, the strands are arranged to substantially increase the tensile strength of the strip 12 in directions both lengthwise and crosswise thereof, so that it is possible to wrap the strip tightly around the pipe.

The strands are saturated with a bitumen, which is preferably asphalt. Asphalt is a good saturant, is not too brittle and softens at a low enough temperature for purposes which will became more apparent hereinafter. The fiber strands would have a natural tendency to absorb moisture, which is of course undesirable in a covering for underground pipe, and the asphalt saturant overcomes this tendency. The asphalt coats the individual fibers of the strands as well as the outer surfaces, and bonds the strands together at the points of crossing.

The laminated strip is manufactured by first providing the lamination 14 composed of the crossing strands saturated with the asphalt. The lamination 14 is shown in a continuous length on a roll 20 in FIG. 1, and is drawn over rolls 21, 22, 23 and 24 by a winder, not shown. An extruder 25 extrudes a thin film 26 of the plastic, preferably polyethylene, from which the lamination 13 is formed. The extruded film is of the same width as the strand lamination 14, and is extruded onto one surface of the strand lamination 14 between rolls 22 and 23. These rolls impose a degree of pressure to cause a good surface-to-surface contact between the laminations. Asphalt softens at about 220° F. and the polyethylene film leaves the extruder at about 615° F. The temperature of the polyethylene film when it contacts the strands is still above the softening temperature of the asphalt and above its own softening temperature which is about 300° F. The asphalt used contains a certain amount of wax, which is basically the same molecule as polyethylene. Hence the molecules of asphalt and polyethylene are compatible and have almost a complete affinity for one another, and therefore a permanent molecular bond or fusion takes place between the polyethylene lamination and the asphalt of the strand lamination. The fused material solidifies or sets while passing over chill roll 23 which is maintained at a temperature of 60° F.

The resulting laminated strip 12 is very flexible and can be readily wrapped spirally around the pipe, as shown. The strip is wrapped so that the stranded lamination 14 forms the outer surface of the wrapper, and hence is more resistant to soil stress. The fibers of the reinforcing lamination 14 greatly increase the tensile strength of the strip making it possible to tightly wrap the strip on the pipe.

Usually the pipe is first coated with the wax coating 11. This will be applied in a liquid or semi-molten form at an elevated temperature. The wrapper 12, in accordance with conventional practice, will be applied immediately after the coating 11, and while the coating has a temperature at or above the softening temperature of the polyethylene (300° F. or more). Hence there is a tendency for the polyethylene to melt or tear. However, melting or tearing is prevented by reason of the close spacing of the strands. Were the strands spaced too far apart, a drop of hot wax would melt or tear a hole in the polyethylene in the spaces between the strands.

Sometimes a second coating of wax is applied over the strip 12, overwrapped with kraft paper. The additional coating and the kraft paper may, however, be omitted. Also, as pointed out above, the strip 12 may comprise the sole protection for the pipe.

What I claim as my invention is:

1. The method of making an elongated reinforced strip, for use in the protection of underground pipes against corrosion, composed of a polyethylene film and reinforcing strands; comprising providing a length of bitumen saturated reinforcing strands, extruding a film of heat-softened polyethylene upon one surface of said length of strands at a temperature above the softening temperature of the bitumen saturant to soften the latter and cause it to fuse with the polyethylene to provide a laminated strand-reinforced strip, and cooling the strip to solidify the fused polyethylene and bitumen.

2. An elongated, flexible, laminated strip adapted to be wrapped around a length of underground pipe to provide a reinforced covering therefor, said strip having a first lamina in the form of a film of polyethylene constituting an exposed side of said strip, and a second lamina constituting the opposite exposed side of said strip, said second lamina comprising flexible reinforcing strands saturated with a bitumen which is compatible with the polyethylene of said film, the bitumen and polyethylene being integrally fused together permanently securing said strands to said film.

3. An elongated, flexible, laminated strip adapted to be wrapped around a length of underground pipe to provide a reinforced covering therefor, said strip having a first lamina in the form of a film of polyethylene constituting an exposed side of said strip, and a second lamina constituting the opposite exposed side of said strip, said second lamina comprising a series of flexible reinforcing strands saturated with a bitumen which is compatible with the polyethylene of said film, the bitumen saturant and polyethylene being integrally fused together permanently securing each of said strands to said film, said strands being arranged in laterally spaced relation, approximately twenty strands per inch.

4. The laminated strip defined in claim 3, wherein said strands are glass fibers and said bitumen is asphalt.

5. An elongated, flexible, laminated strip adapted to be wrapped around a length of underground pipe to provide a reinforced covering therefor, said strip having a first lamina in the form of a film of polyethylene constituting an exposed side of said strip, and a second lamina constituting the opposite exposed side of said strip, said second lamina comprising first and second series of flexible reinforcing strands of glass fibers saturated with asphalt which is compatible with and has a high affinity for polyethylene, said first series of strands extending lengthwise of said strip in laterally spaced, substantially parallel relation, said second series of strands extending crosswise of said strip in laterally spaced, parallel relation, the asphalt saturant and polyethylene being integrally fused together permanently securing each of said strands to said film.

6. The laminated strip defined in claim 5, wherein the strands of said first series are interwoven with the strands of said second series and the strands of each series are arranged approximately twenty strands per inch.

References Cited by the Examiner

UNITED STATES PATENTS

| | | | |
|---|---|---|---|
| 2,311,572 | 2/1943 | Reynolds | 154—50 |
| 2,360,109 | 10/1944 | Converse | 138—145 |
| 2,713,551 | 7/1955 | Kennedy | 154—52 |
| 2,828,798 | 4/1958 | Hopkins et al. | 156—187 |
| 2,893,907 | 7/1959 | Bove | 154—50 |
| 2,897,841 | 8/1959 | In Wai Hui et al. | 138—64 |
| 2,956,917 | 10/1960 | Fasano | 156—321 X |
| 3,010,860 | 11/1961 | Eberl | 161—236 |
| 3,075,864 | 1/1963 | Anderson | 154—46.8 |

FOREIGN PATENTS 1,042,107  6/1953  France.

ALEXANDER WYMAN, *Primary Examiner.*

EARL M. BERGERT, *Examiner.*

H. L. GATEWOOD, G. D. MORRIS,
*Assistant Examiners.*